United States Patent [19]

Greenslade

[11] Patent Number: 5,182,865

[45] Date of Patent: Feb. 2, 1993

[54] APPARATUS FOR MEASURING WORKPIECE CONCENTRICITY

[76] Inventor: Joe E. Greenslade, P.O. Box 330865, Fort Worth, Tex. 76163

[21] Appl. No.: 913,446

[22] Filed: Jul. 14, 1992

[51] Int. Cl.$^5$ ................................................ G01B 5/20
[52] U.S. Cl. .................................................... 33/550
[58] Field of Search ........................... 33/549, 550, 543

[56] References Cited

U.S. PATENT DOCUMENTS 2,806,294  9/1957  Cargill .............................. 33/550 X
4,679,330  7/1987  Williams ............................ 33/550

OTHER PUBLICATIONS

Universal Concentricity Gages, The Modern Way to Increase Gaging Efficiency, Universal Punch Corp., Santa Ana, Calif.

Primary Examiner—Harry N. Haroian
Attorney, Agent, or Firm—James E. Bradley

[57] ABSTRACT

An apparatus for measuring workpiece concentricity having a base, a concentricity spin fixture, a spring-biased shaft, a collet, a follower member, and a concentricity indicator. The concentricity spin fixture receives a collet which receives workpieces of varying shank diameters and drive profiles. A follower member designed to engage a specific workpiece drive profile is biased against the workpiece drive profile by the spring-biased shaft. A test operator measures concentricity by rotating the workpiece using the concentricity spin fixture and by measuring the movement of the follower member against the spring-biased shaft using the concentricity indicator. The apparatus is capable of measuring the concentricity of workpieces having a shank and a drive profile, such as screws, bolts, other fasteners, and punches.

24 Claims, 2 Drawing Sheets

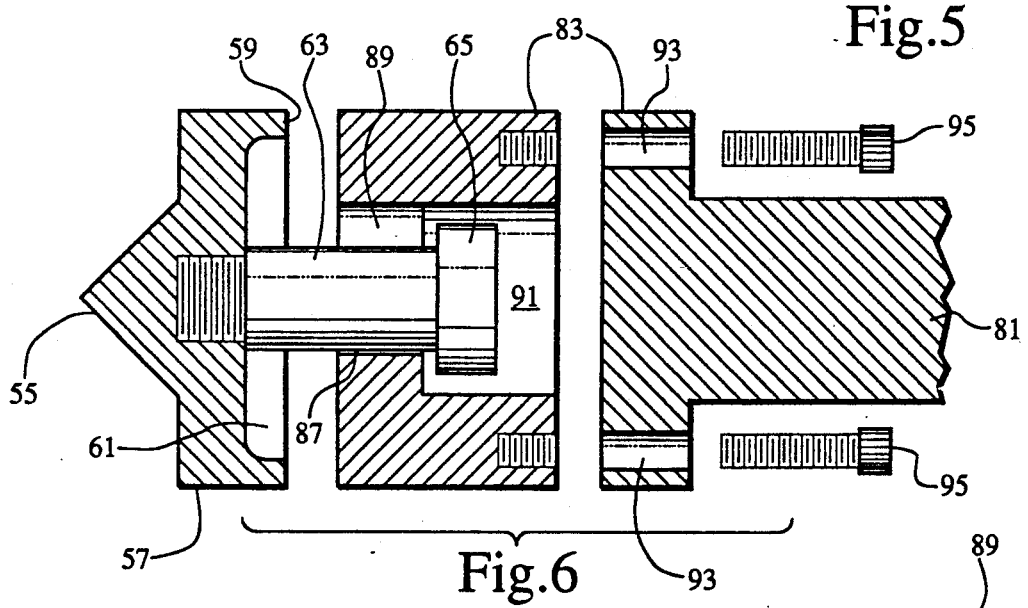

APPARATUS FOR MEASURING WORKPIECE CONCENTRICITY

BACKGROUND OF THE INVENTION

1. Field of the Invention

This invention relates generally to an apparatus for measuring the concentricity of workpieces having both a shaft and a drive profile.

2. Summary of the Prior Art

Typical workpieces requiring concentricity measurement include fasteners with internal drive profiles such as slotted, cross, hexagonal, and square recesses; fasteners with external drive profiles, such as hexagonal heads; and other workpieces such a punches which can have either internal or external drive profiles. The concentricity of a workpiece shank to a workpiece drive profile is critical for the operation of modern automated assembly equipment. If the drive profile and shank do not share a common axis, automated assembly equipment will often malfunction and cannot perform efficiently.

Although a wide body of prior art exists describing devices which measure the diameters of threaded and non-threaded cylindrical objects, the prior art describing workpiece concentricity measurement is limited. However, devices capable of measuring the concentricity of screws and punches are marketed.

One prior art device uses a cam-actuated lever arm to hold the workpiece shank between three cylindrical, rotatable members. Two of these members are manually rotated to provide 360 degree rotation of the workpiece about the axis of the workpiece shank. This prior art device is equipped with a screw recess checking attachment having an end which engages the workpiece drive profile, structural elements constraining the attachment to vertical, linear motion, and a second end contacting the probe of a dial test indicator. The dial test indicator measures any non-concentricity of the workpiece while the cylindrical members rotate the workpiece about the axis of the workpiece shank.

SUMMARY OF THE INVENTION

This invention provides an apparatus and a method for measuring workpiece concentricity which is easy to use, accurate, and capable of measuring workpieces of varying shank diameters and drive profiles.

The apparatus provides a base which carries a concentricity spin fixture having an axis of rotation. The spin fixture is opposed by a frame mounted on the base and supporting a spring-biased shaft. The linear distance between the spin fixture and the opposing frame can be quickly adjusted to accommodate successive workpieces for measurement. The spin fixture receives a collet, and the collet receives a workpiece for measurement. When the workpiece is held by the concentricity spin fixture, a test operator can rotate the workpiece about the axis of rotation using a crank handle located on one end of the spin fixture.

The spring-biased shaft is located coaxially with the axis of rotation of the spin fixture, and it performs two basic functions. First, it biases a follower member designed to engage the drive profile of the workpiece between the drive profile and the end of the shaft. This bias allows the non-engaging end of the following member to move freely against the end of the shaft during rotation. Second, the shaft functions in coordination with several structural members to position a spring-biased probe of a concentricity indicator so that it rests on the smooth, peripheral surface of the follower member. This mechanical relationship allows the indicator to detect any non-concentricity of the workpiece when the workpiece is rotated in the concentricity spin fixture.

Other features and advantages of the present invention will become apparent to one skilled in the art with reference to the following detailed description.

BRIEF DESCRIPTION OF THE DRAWINGS

FIG. 2 is an enlarged front elevation view of portions of the apparatus of FIG. 1.

FIG. 3 is a sectional view of an alternate embodiment of a follower member of the apparatus of FIG. 1.

FIG. 4 is a side elevation view of another workpiece for measurement by the apparatus of FIG. 1.

FIG. 5 is a sectional view of a second alternate embodiment of a follower member of the apparatus of FIG. 1 for engaging the workpiece of FIG. 4.

FIG. 6 is a partially exploded, enlarged sectional view of portions of FIG. 2.

FIG. 7 is a cross-sectional view of portions of FIG. 6 along line A—A.

DETAILED DESCRIPTION OF THE INVENTION

Figure 1:
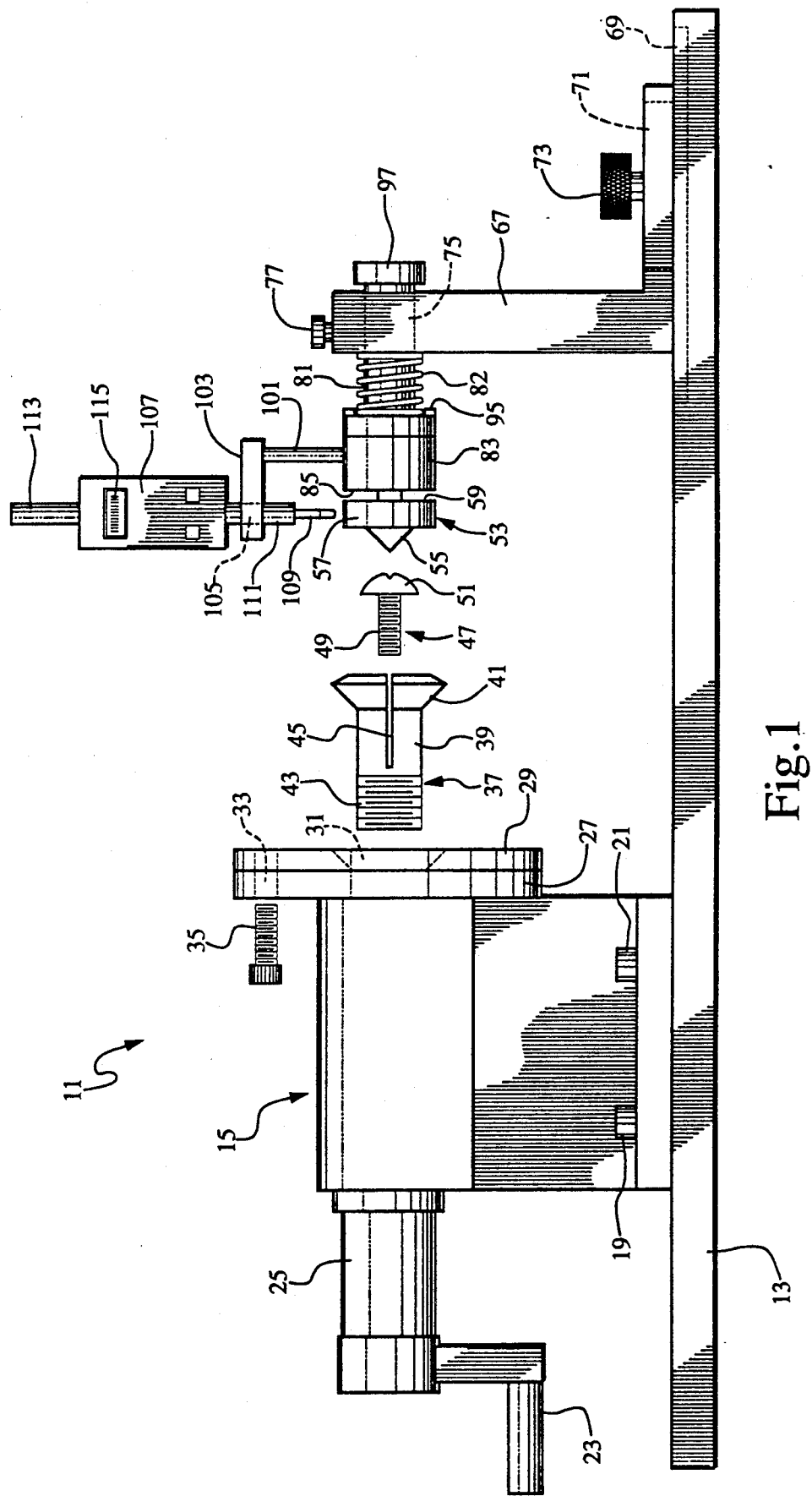
FIG. 1 is a partially exploded, front elevation view of the workpiece concentricity measuring apparatus of the present invention.

FIG. 1 illustrates a workpiece concentricity measuring apparatus according to the present invention. The workpiece concentricity measuring apparatus 11 has a base 13. Base 13 is a flat plate suitable for resting on a flat surface such as a table. A concentricity spin fixture 15 is rigidly mounted to base 13 by bolts 19 and 21. Concentricity spin fixture 15 is composed of a crank handle 23, a spindle 25, a chuck 27, and a face plate 29. Spin fixture 15 has an axis of rotation about the centerline of spindle 25. Face plate 29 has an axial, countersunk bore 31. Chuck 27 and face plate 29 have mating cylindrical holes 33 which receive a locking pin 35 and which are offset from the axis of rotation of spin fixture 15. Crank handle 23 is capable of rotating spindle 25, face plate 29, and collet 37. Chuck 27 does not rotate.

Collet 37 includes a hollow shank 39, a receiving head 41, threads 43, and slots 45. The threads 43 secure collet 37 into a threaded receptacle, not shown in FIG. 1, within spindle 25. Collet 37 frictionally receives workpiece 47. Workpiece 47 has a threaded shank 49 and a drive profile 51. The inner diameter of hollow shank 39 is slightly greater than the outer diameter of threaded shank 49. Slots 45 allow hollow shank 39 to contract to frictionally secure shank 49. In the embodiment shown, drive profile 51 comprises two intersecting recesses defining a Philips head on workpiece 47.

A follower member 53 is designed to interface with workpiece drive profile 51 through an engaging profile 55, located on the forward side of follower member 53. In the embodiment of FIG. 1, engaging profile 55 is a convex, conical surface designed to engage Philips drive profile 51. When workpiece 47 is rotated, drive profile 51 drives engaging profile 55 causing follower member 53 to rotate in unison. Follower member 53 also has a cylindrical outer periphery 57 and a recessed contacting surface 59 located on its rearward side. As shown in FIG. 6, recessed contacting surface 59 is a thin, annular, flat band encircling a cylindrical depression 61. Shoulder screw 63 is mounted coaxially with and extends horizontally from cylindrical depression 61. Shoulder screw 63 has a cylindrical shoulder 64 and a screw head 65 of a greater diameter than shoulder 64. As will be later explained in greater detail, shoulder screw 63 prevents follower member 53 from falling to the floor between successive measurements of different workpieces.

As shown in FIG. 1, engaging frame 67 is an angled structural support member having a horizontal portion carried by base 13 opposite spin fixture 15. Base 13 has a recessed groove 69 which receives the horizontal portion of frame 67. Frame 67 slides within recessed groove 69, and groove 69 insures that frame 67 is aligned collinearly with the axis of rotation of spin fixture 15. The horizontal portion of frame 67 has a slotted groove 71. A locking bolt 73 passes through slotted groove 71 to secure frame 67 to base 13. An upright portion of frame 67 has a horizontal, cylindrical bore 75 aligned coaxially with the axis of rotation of spin fixture 15. An anti-rotation pin 77 mounted vertically within the upright portion of frame 67 intersects cylindrical bore 75.

A shaft 81 is mounted through cylindrical bore 75. Anti-rotation pin 77 intersects a longitudinal slot, not shown in FIG. 1, which runs longitudinally along shaft 81. Shaft 81 has a shaft end 83 nearest the concentricity spin fixture 15 with a smooth, flat contacting surface 85. Contacting surface 85 bears against contacting surface 59 of follower member 53 to maintain follower member 53 in engagement with workpiece 47. As shown in FIG. 6, the cylindrical depression 61 reduces the friction between the two contacting surfaces 59 and 85. A backstop 97 is located on the other end of shaft 81 to limit the travel of shaft 81. Spring 82 biases shaft 81 between shaft end 83 and frame 67 in a forward direction.

As shown in FIGS. 6 and 7, shaft end 83 has a forward and a rearward portion. The forward portion of shaft end 83 has a supporting bore 87 and a receiving bore 89 drilled into the center of contacting surface 85. Receiving bore 89 receives screw head 65 of shoulder screw 63, and supporting bore 87 supports shoulder 64 of shoulder screw 63. Supporting bore 87 has a diameter less than receiving bore 89 but greater than the diameter of shoulder 64 of shoulder screw 63. Bores 85 and 87 lead into a cylindrical, axial cavity 91 which terminates against the solid rearward portion of shaft end 83. The forward and rearward portions of shaft end 83 are rigidly connected through threaded receptacles 93 and bolts 95.

Referring to FIG. 1, a vertical support member 101 is rigidly mounted on the outer periphery of shaft end 83. A horizontal support member 103 is cantilevered from vertical support member 101 in a direction toward concentricity spin fixture 15. Horizontal support member 103 is a bracket which has a finely threaded cylindrical bore 105 used to support a concentricity indicator 107. Concentricity indicator 107 is well known in the art and has a spring-biased probe 109, a finely threaded adjustment member 111, a fine vertical adjustment knob 113, and a concentricity gage display 115. Bore 105 of horizontal support 103 supports the finely threaded adjustment member 111 of concentricity indicator 107 in a constant position over the symmetrical outer periphery 57 of follower member 53.

The operation of the workpiece concentricity measuring apparatus of the present invention will now be discussed with reference to FIGS. 1, 2, and 6. First, a test operator inserts locking pin 35 into cylindrical holes 33, preventing face plate 29 from rotating. A test operator inserts collet 37 into concentricity spin fixture 15, holds collet 37 to prevent rotation, and turns crank handle 23 in a counter-clockwise direction until collet threads 43 begin to screw into the threaded receptacle of spindle 25. Shank 49 of workpiece 47 is inserted into hollow shank 39 of collet 37 to the point where a length equal to the diameter of shank 49 extends from the bottom side of workpiece drive profile 51 to the surface of collet receiving head 41. While holding collet 37 to prevent rotation, a test operator turns crank handle 23 counter-clockwise. This rotation causes countersunk bore 31 of face plate 29 to exert pressure on the mating, canted surface of receiving head 41 of collet 37, closing slots 45 and frictionally securing workpiece 47.

A test operator loosens locking bolt 73 and slides engaging frame 67 along recessed groove 69 toward spin fixture 15. Engaging frame 67 is positioned so that engaging profile 55 of follower member 53 is positioned within workpiece drive profile 51, contacting surface 59 of follower member 53 is biased against contacting surface 85 of shaft end 83, and spring 82 is slightly compressed. Locking bolt 73 is then tightened, maintaining this mechanical relationship.

Through the mechanical cooperation of follower member 53, spring-biased shaft 81, vertical support member 101, and horizontal support member 103, the spring-biased probe 109 of concentricity indicator 107 is automatically positioned above the symmetrical outer periphery 57 of follower member 53. If necessary, a test operator turns fine vertical adjustment knob 113 to rotate fine-threaded adjustment member 111 through fine-threaded bore 105, so that spring-biased probe 109 rests on the surface of symmetrical outer periphery 57 of follower member 53. FIG. 2 illustrates the mechanical relationship between the critical components of concentricity measuring apparatus during concentricity measurement of workpiece 47. A test operator then disengages lock pin 35 from cylindrical holes 33 so that spindle 25, face plate 29, collet 37, and workpiece 47 can be rotated by spin fixture 15.

A test operator calibrates concentricity indicator 107 by rotating crank handle 23 three times clockwise and then three times counter-clockwise. The test operator then zeroes concentricity gag display 115.

To measure concentricity, a test operator rotates crank handle 23 three times clockwise and three times counter-clockwise. This rotation also rotates the drive profile 51 of workpiece 47 as well as follower member 53. Recessed contacting surface 59 of follower member 53, smooth contacting surface 85 of shaft end 83, shoulder 65 of shoulder screw 63, and supporting bore 87 of shaft end 83 cooperate to reduce friction and allow follower member 53 to exhibit free motion against the smooth contacting surface 85 of shaft end 83. This motion is in a plane perpendicular to the axis of rotation of spin fixture 15 and is proportional to any non-concentricity of workpiece 47. Spring-biased probe 109 moves vertically with the planar motion of follower member 53 through its contact with symmetrical outer periphery 57.

After rotating crank handle 23 three times in each direction, the test operator observes the reading on concentricity gage display 115. The concentricity indicator is then zeroed, and the measurement procedure is repeated until an identical reading is obtained two successive times. A test operator records this reading as the concentricity measurement for workpiece 47.

To remove workpiece 47 after concentricity measurement, a test operator loosens locking bolt 73 and slides engaging frame 67 along recessed groove 69 away from spin fixture 15. After engaging locking pin 35 in cylindrical holes 33, a test operator rotates crank handle 23 in a clockwise direction to loosen the frictional hold on shank 49 of workpiece 47. During rotation, locking pin 35 prevents face plate 29 from rotating and allows collet 37 to unscrew from spindle 25 without a test operator holding collet 37. Workpiece 47 is then removed.

In an unbiased state between measurements, follower member 53 is loosely supported from shaft end 83 by the cooperation of shoulder screw 63 with cylindrical, axial cavity 91. Shoulder 65 of shoulder screw 63 rests loosely upon a lower surface of supporting bore 87 of shaft end 83, and screw head 65 of shoulder screw 63 bears against the interior of cylindrical cavity 91 of shaft end 83. To remove follower member 53 from shaft end 83, screw head 65 is slid through receiving bore 89 of shaft end 83.

The contacting surface 59 of follower member 53 and the contacting surface 85 of shaft end 83 should be periodically coated with a light oil. This coating will further reduce friction between the two contacting surfaces 59 and 85 and will improve the measurement accuracy of apparatus 11.

FIG. 3 shows a follower member 121 with a concave, conical engaging profile 123 on its forward side, a smooth, cylindrical outer periphery 125, and a recessed contacting surface 127 on its rearward side. Recessed contacting surface 127 is a thin, annular, flat band encircling a cylindrical depression 129. Follower member 121 is designed to engage a workpiece with a convex, conical drive profile, and follower member 121 interfaces with contacting surface 85 of shaft end 83 and spring-biased probe 10 of concentricity indicator 107.

FIG. 4 shows a workpiece 131 with a threaded shank 133 and an external, hexagonal drive profile 135. Workpiece 131 is engaged by follower member 141, as shown in FIG. 5. Follower member 141 has an internal, hexagonal engaging profile 143 on its forward side, a smooth, cylindrical outer periphery 145, and a recessed contacting surface 147 on its rearward side. Recessed contacting surface 147 is a thin, annular, flat band encircling a cylindrical depression 149. Follower member 141 interfaces with contacting surface 85 of shaft end 83 and spring-biased probe 109 of concentricity indicator 107.

The concentricity measuring apparatus of the present invention has significant advantages. First, the apparatus provides a method of measuring workpiece concentricity that is quick, easy to use, and accurate. Second, the apparatus requires minimal adjustment between the successive measurement of identical workpieces, and the device requires only minor adjustments for successive measurement of workpieces with varying shank diameters or varying attachment profiles.

The present invention has been described with reference to three preferred embodiments. One skilled in the art will appreciate that the present invention is not so limited and is susceptible to variations without departing from the scope of the invention.

I claim:

1. An apparatus for measuring the concentricity of a workpiece, the workpiece having a shank and a drive profile, comprising in combination:

a base;
a holder means mounted on the base and having an axis of rotation for releasably receiving the workpiece shank and for rotating the workpiece about the axis of rotation;
a follower member having an engaging profile for engaging the workpiece drive profile for rotation therewith, the follower member also having a symmetrical outer periphery and a contacting surface on an end opposite the engaging profile;
an engaging means carried by the base and opposing the holder means for biasing the engaging profile of the follower member against the workpiece drive profile, the engaging means having a contacting surface that slidingly contacts the contacting surface of the follower member, so that when the workpiece is rotated by the holder means the follower member is capable of planar motion relative to the contacting surface of the engaging means proportional to any non-concentricity of the workpiece; and
an indicator means carried by the base for measuring any workpiece non-concentricity, the indicator means having a spring-biased probe capable of linear extension and retraction which slidingly contacts the outer periphery of the follower member.

2. The apparatus according to claim wherein a selected one of the contacting surfaces is an annular, flat band encircling a central recess reducing the surface area touching the other contacting surface.

3. The apparatus according to claim wherein the contacting surface of the follower member is an annular, flat band encircling a central recess reducing the surface area touching the other contacting surface.

4. The apparatus according to claim wherein the engaging means comprises:

a frame having a bore coaxial with the axis of rotation of the holder means;
a spring-biased shaft mounted through the bore having as one end the contacting surface of the engaging means; and
an adjusting means for providing adjustable positioning of the frame on the base in a direction collinear with the axis of rotation of the holder means.

5. The apparatus according to claim 1 wherein the engaging means comprises:

a frame having a bore coaxial with the axis of rotation of the holder means; and
a spring-biased shaft mounted through the bore having as one end the contacting surface of the engaging means.

6. The apparatus according to claim further comprising an adjusting means carried by the base for varying the linear spacing between the holder means and the engaging means.

7. The apparatus according to claim wherein the drive profile of the workpiece is a recess and the engaging profile of the follower member is a protruding conical surface for engaging the recess.

8. The apparatus according to claim wherein the drive profile of the workpiece is a protruding surface with a symmetrical periphery and the engaging profile of the follower member is a recess for engaging the protruding surface.

9. The apparatus according to claim further comprising a support means for loosely supporting the follower member from the engaging means when the follower member is in an unbiased state.

10. An apparatus for measuring the concentricity of a workpiece, the workpiece having a shank and a drive profile, comprising in combination:
   a base;
   a holder means mounted on the base and having an axis of rotation for releasably receiving the workpiece shank and for rotating the workpiece about the axis of rotation;
   a follower member having an engaging profile for engaging the workpiece drive profile for rotation therewith, the follower member also having a symmetrical outer periphery and a contacting surface on an end opposite the engaging profile;
   a frame carried by the base and opposing the holder means, the frame having a cylindrical bore coaxial with the axis of rotation of the holder means;
   a shaft mounted through the cylindrical bore, the shaft having as one end a contacting surface for sliding contact with the contacting surface of the follower member;
   a spring means carried by the shaft for biasing the engaging profile of the follower member against the drive profile of the workpiece and the contacting surface of the follower member against the contacting surface of the shaft, so that when the workpiece is rotated by the holder means, the contacting surface of the follower member is capable of motion in a plane perpendicular to the axis of rotation of the holder means, the motion being proportional to any non-concentricity of the workpiece;
   an adjusting means carried by the base for varying the linear spacing between the holder means and the frame; and
   an indicator means carried by the base for measuring any planar motion of the follower member, the indicator means having a probe in sliding contact with the outer periphery of the follower member.

11. The apparatus according to claim 10 wherein a selected one of the contacting surfaces is an annular, flat band encircling a central recess reducing the surface area touching the other contacting surface.

12. The apparatus according to claim 10 wherein the contacting surface of the follower member is an annular, flat band encircling a central recess reducing the surface area touching the other contacting surface.

13. The apparatus according to claim 10 wherein:
   a selected one of the contacting surfaces comprises a smooth, narrow, peripheral band having a flat surface; and
   the other contacting surface comprises a smooth, flat, surface with a symmetrical periphery of substantially equal diameter.

14. The apparatus according to claim 10 wherein the adjusting means comprises:
   a slotted groove within the frame providing linear adjustment of the frame relative to the base;
   an alignment means carried by the base for receiving the frame and for aligning the frame with the axis of rotation of the holder means; and
   a locking bolt capable of securing the frame to the base at variable positions along the slotted groove.

15. The apparatus according to claim 10 further comprising mounting means for mounting the indicator means to the shaft for movement therewith.

16. The apparatus according to claim 15 wherein the mounting means comprises:
   a vertical support member rigidly secured to the shaft and extending in a vertical direction perpendicular to the shaft;
   a horizontal support member extending horizontally from an upper end of the vertical support member; and
   the indicator means mounted to the horizontal support member.

17. The apparatus according to claim 10 wherein the drive profile of the workpiece is a recess and the engaging profile of the follower member is a protruding, conical surface for engaging the recess.

18. The apparatus according to claim 10 wherein the drive profile of the workpiece is a protruding surface with a symmetrical periphery and the engaging profile of the follower member is a recess for engaging the protruding surface.

19. The apparatus according to claim 10 further comprising a support means for loosely supporting the follower member from the engaging means when the follower member is in an unbiased state.

20. An apparatus for measuring the concentricity of a workpiece, the workpiece having a shank and a drive profile, comprising in combination:
   a base;
   a collet for releasably receiving the workpiece;
   a concentricity spin fixture mounted on the base for releasably receiving the collet and for rotating the collet and the workpiece about an axis of rotation;
   a follower member having an engaging profile for engaging the workpiece drive profile for rotation therewith, the follower member also having a symmetrical outer periphery and a contacting surface on an end opposite the engaging profile, the contacting surface being an annular, flat band encircling a central recess;
   a frame carried by the base and opposing the concentricity spin fixture, the frame having a cylindrical bore coaxial with the axis of the rotation of the concentricity spin fixture and a slotted groove running parallel to the base;
   a shaft mounted through the cylindrical bore, the shaft having as one end a smooth, flat, symmetrical contacting surface of substantially equal diameter to the contacting surface of the follower member;
   spring means on the shaft for biasing the engaging profile of the follower member against the workpiece drive profile, the contacting surface of the shaft slidingly contacting the contacting surface of the follower member, so that when the workpiece is rotated in the concentricity spin fixture the contacting surface of the follower member is capable of planar motion relative to the contacting surface of the shaft proportional to any non-concentricity of the workpiece;
   an alignment means carried by the base for receiving the frame and for aligning the frame with the axis of rotation of the concentricity spin fixture;
   a locking bolt capable of securing the frame to the base at variable positions along the slotted groove;
   an indicator means for measuring any workpiece non-concentricity having a spring-biased probe capable of linear extension and retraction which engages the symmetrical outer periphery of the follower member, and having an electromechanical gage capable of measuring the high and low points of motion of the outer periphery of the follower member against the contacting surface of the shaft;

a vertical support member rigidly secured to the shaft and extending vertically therefrom; and a horizontal member cantilevered from the vertical support member supporting the indicator means and maintaining the indicator probe in sliding contact with the outer periphery of the follower member during rotation of the workpiece.

21. The apparatus according to claim 20 wherein the drive profile of the workpiece is a recess and the engaging profile of the follower member is a protruding conical surface for engaging the recess.

22. The apparatus according to claim 20 wherein the drive profile of the workpiece is a protruding surface of a symmetrical periphery and the engaging profile of the follower member is a recess for engaging the protruding surface.

23. The apparatus according to claim 20 further comprising:

a shoulder screw mounted concentrically on and extending horizontally from the central recess of the contacting surface of the follower member, the shoulder screw having a shoulder and a head;

a hollow, axial cavity in the end of the shaft having the contacting surface; and an axial bore through the contacting surface of the shaft leading to the hollow, axial cavity, the axial bore having a upper section for receiving the head of the shoulder screw and a lower section for loosely supporting the shoulder of the shoulder screw, so that the follower member is loosely supported from the axial bore in an unbiased state while still being capable of planar motion against the contacting surface of the shaft in a biased state.

24. A method of measuring the concentricity of a workpiece, the workpiece having a shank and a drive profile, comprising:

inserting the workpiece into a holder having an axis of rotation;

biasing a follower member against the drive profile of the workpiece;

providing the follower member with a symmetrical outer periphery;

providing a concentricity indicator having an indicator probe;

maintaining the indicator probe in sliding contact with the outer periphery of the follower member;

rotating the holder and thus the workpiece about the axis of rotation; and monitoring the indicator to determine workpiece concentricity.

* * * * *